United States Patent [19]

Porter et al.

[11] Patent Number: 5,063,662
[45] Date of Patent: Nov. 12, 1991

[54] METHOD OF FORMING A HOLLOW BLADE

[75] Inventors: David Porter, Niantic; James R. Dillner, Amston; Peter E. Leibfried, Vernon; William R. Reimels, Manchester; J. George Asfalg, Cromwell, all of Conn.

[73] Assignee: United Technologies Corporation, Hartford, Conn.

[21] Appl. No.: 641,327

[22] Filed: Jan. 15, 1991

Related U.S. Application Data

[63] Continuation of Ser. No. 497,283, Mar. 22, 1990, abandoned.

[51] Int. Cl.⁵ .................................................. B21D 53/78
[52] U.S. Cl. ................................ 29/889.72; 29/889.7; 72/299; 148/11.5 F
[58] Field of Search ........................ 29/889.72, 889.7; 148/11.5 F; 72/296, 299, 371

[56] References Cited

U.S. PATENT DOCUMENTS

| | | | |
|---|---|---|---|
| 3,329,535 | 4/1967 | Langer et al. | 148/11.5 F |
| 3,623,204 | 11/1971 | Wagle | 29/156.8 H |
| 3,628,226 | 12/1971 | Nelson | 29/156.8 H |
| 4,527,410 | 7/1985 | MacNitt, Jr. et al. | 29/889.7 |
| 4,596,064 | 6/1986 | Prew | 72/299 |

FOREIGN PATENT DOCUMENTS

| | | | |
|---|---|---|---|
| 0092164 | 6/1982 | Japan | 148/11.5 F |
| 0640782 | 1/1979 | U.S.S.R. | 72/299 |
| 0803225 | 5/1982 | U.S.S.R. | 72/299 |

Primary Examiner—Irene Cuda
Attorney, Agent, or Firm—Edward L. Kochey, Jr.

[57] ABSTRACT

An untwisted hollow blade with internal reinforcing ribs is formed by diffusion bonding two halves. A predominate portion of the blade twist is accomplished by gravity creep deforming against a supporting die, aided by applying twisting moments at the ends. The blade is free to move axially at one end. Simultaneous heat soak for solution heat treatment minimizes overall grain growth. Later, hot forming between heated dies is supplemented with internal blade pressure after die closing. Metal flow is more easily predictable whereby finite element analysis may establish the proper starting form.

35 Claims, 7 Drawing Sheets

METHOD OF FORMING A HOLLOW BLADE

This application is a continuation of U.S. application Ser. No. 07/497,283, filed Mar. 22, 1990, now abandoned.

TECHNICAL FIELD

The invention relates to forming of compressor blades for axial compressors, and in particular to forming hollow complex shaped blades.

BACKGROUND OF THE INVENTION

Solid compressor blades with mid-span dampers providing stability have been the standard throughout the gas turbine industry. It is desirable to gain aerodynamic efficiencies by removing the mid-span damper. This leads to greatly increased chord width to gain equivalent stiffness in the shroudless blade as well as the necessity for hollowness to reduce weight.

In the background description of U.S. Pat. No. 3,628,226 reference is made to fabrication of hollow blades by milling forged blanks. These blanks are twisted and thereafter bonded together. The bonding surfaces are accordingly not in a single plane which makes it difficult to apply the compressive bonding load.

The improvement described in U.S. Pat. No. 3,628,226 comprises first grooving flat blanks, and forming the grooved blank into a preliminary airfoil surface without longitudinal curvature. Next the blanks are machined flat on the inner surface. These blanks are then diffusion bonded to form a rough blade, and thereafter the blade is twisted to form the final blade.

In order to produce the desired final blade without complex final machining, the starting form must be established. This must be established with knowledge of a predictable and constant metal flow during the forming operation. With the prior art forming techniques this has not been found to be possible. Necking of material thickness on stretching, wrinkling of compressed portions, die friction, and hot or cold spots in the dies have been some of the problems.

SUMMARY OF THE INVENTION

The blade forming method of the invention provides a smooth, accurate final blade form with predictable and consistent metal flow during forming. Accordingly, the starting material sizing can properly be determined and consistent blades formed. Inherent manufacturing tolerances are accommodated without accepting an under thickness in the final blade by sizing the intermediate blade form with overthickness in the tolerance range. There is also provided a structure which accepts the excess metal flow during the final sizing and forming stage.

With knowledge of the final blade to be formed and the process involved in forming the blade, a finite element analysis untwisting the blade is performed. This determines the starting form of the material. The analysis follows local temperatures, time and strain rate in the reverse direction.

A hollow, untwisted blade of lenticular cross section is formed with axially extending ribs connecting opposite walls of the blade. Preferably this is accomplished by machining tapered blanks with a root attached, to a precise thickness. The blank for each half the blade is formed to establish the lenticular cross section shape, preferably by hot forming to avoid spring back. After the blade is formed with this curvature in the cross-sectional direction, the concave side is cut flat and grooves are machined therein leaving lands which will form the ribs of the blade. These lands preferably decrease in thickness away from the blade material, whereby an hourglass shape will result in the formed blade. The two halves of the blade are then diffusion bonded together. The hourglass form of the rib provides an area for excess metal flow both during diffusion bonding and during later final sizing of the blade.

The machining of the leading and trailing edge of the blade is preferably carried out at this time, thereby avoiding the complex machining problems of dealing with the edge of a twisted blade.

This untwisted blade is then creep deformed without compressive loading other than the very ends and without axial restraint other than at one end. The vast majority of the deformation is carried out at this stage. The blade is placed on a shaped creep die and heated at a controlled rate to a temperature level at which gravity creep forming takes place. Gravity force deforms the blade toward the die and simultaneously twisting moments are applied at each end of the blade. Solution heat treatment of the blade is carried out in this same step by simultaneously soaking at a temperature level which places the beta phase in solution. The use of a die formed of spaced supports provides space for argon quenching of the blade.

Thereafter, superplastic forming is used to establish the final form of the blade. The blade is heated to the superplastic temperature and the die is closed at a rate to produce the appropriate superplastic strain rate. Once the dies are closed an internal pressure is applied with argon gas to assure contact with the die of the portions of the blade between the ribs.

Blending of the leading and trailing edges of the blade may then be carried out to smooth any imperfections which may have developed. The blade is then chemically milled to remove any possible alpha case and conventional machining of the root form, aging, peening, coating, moment weighting and marking of the blade is carried out.

DESCRIPTION OF THE PREFERRED EMBODIMENT

Figure 1:
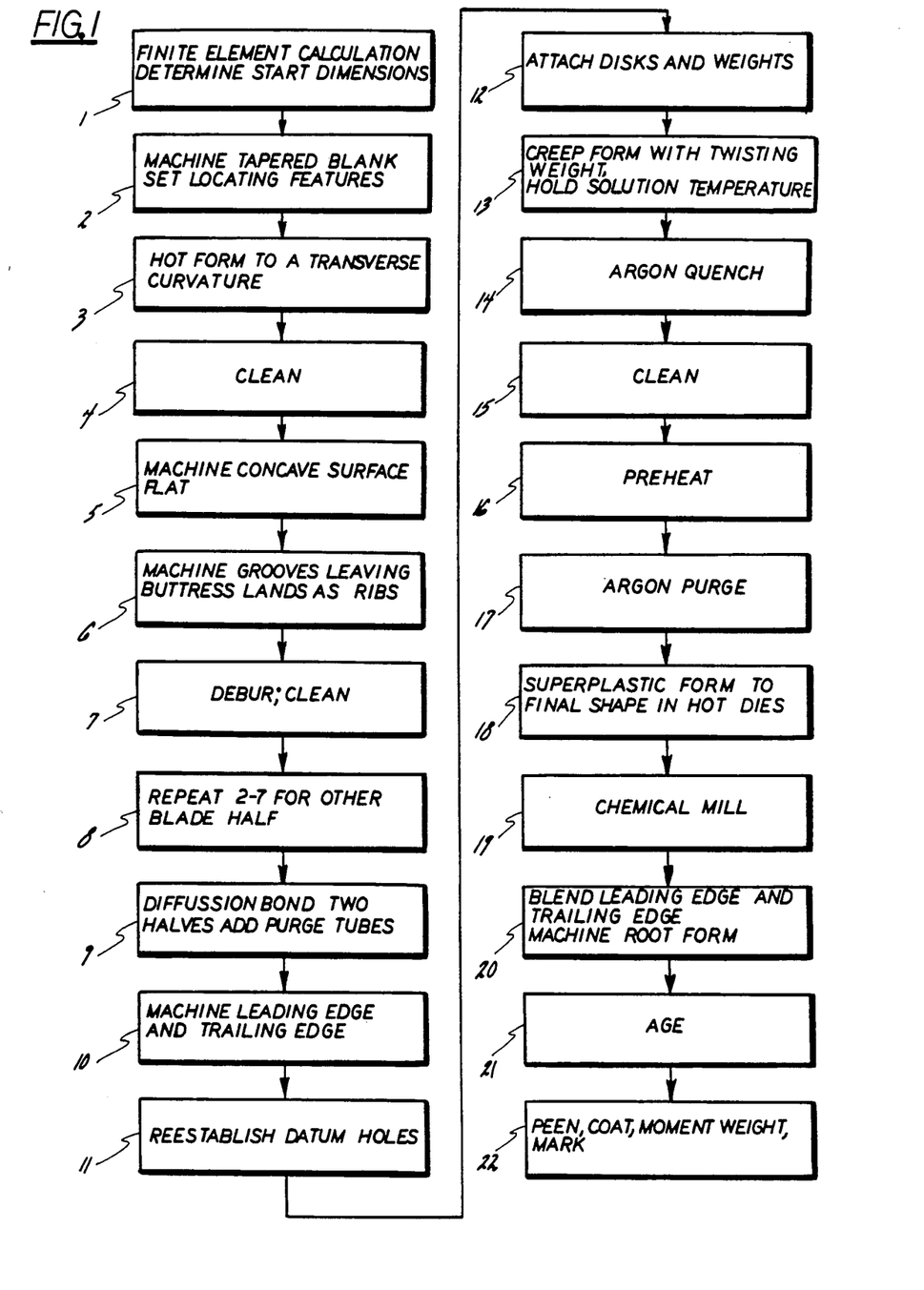
FIG. 1 is a general flowchart of the blade forming operation.

FIG. 1 is a block form flowchart illustrating the steps of the method of forming the final compressor blade. Prior to the manufacture of any particular blade form, a finite element calculation is carried out as indicated in block 1. Such finite element calculations are per se well known and will calculate throughout any physical structure the stresses, strains and deformations through time based on known inputs. The configuration of the final blade to be formed is the starting point of the calculation. The blade is then calculated backwardly through the forming process to be used to determine the starting configuration. The calculation is intimately related to the forming operation to be used and requires the various material properties, forces, strain rate and temperatures at all times. Having determined by this means the starting configuration, the actual forming of the blade may begin.

Figure 2:
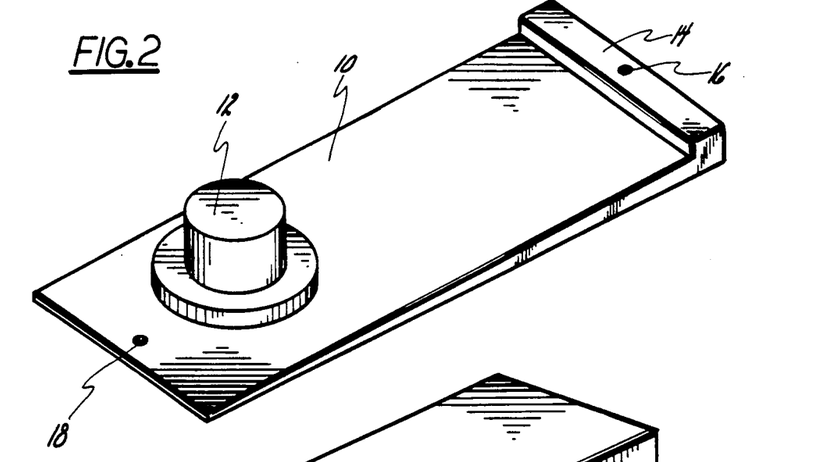
FIG. 2 illustrates machining the tapered blank.

As indicated in block 2 and illustrated in FIG. 2, fine grain 6-4 titanium (6% vanadium, 4% aluminum) starting blank 10 is machined by cutter 12 to a tapered form, which was found to be proper for the final blade. The alpha-beta transformation temperature of this alloy is 1825° F. (995° C.). Other alloys could be used with appropriate modification of temperature and pressure conditions.

Accuracy in establishing the thickness is desired, to achieve the desired shape out of the hot forming step prior to machining the bond plane and rib geometry.

Also secured to this blade is material to form the blade root 14.

A locating feature in the form of hole 16 is located in the root form two inches from the ultimate location of the Z plane. The blade half being machined is preferably fixtured on a vacuum fixture to ensure flatness of the blade being machined, thereby avoiding variations in thickness from the defined dimension.

Figure 3:
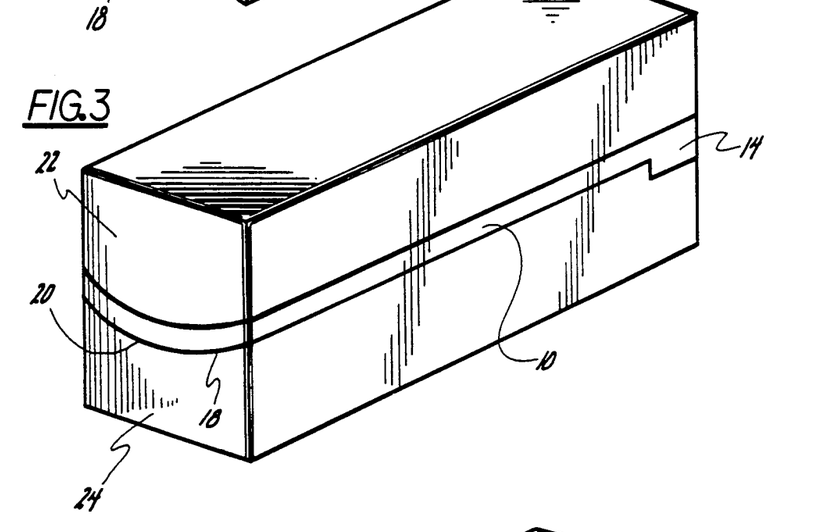
FIG. 3 illustrates hot forming to a transverse curvature.

Block 3 of FIG. 1 notes and FIG. 3 illustrates the forming of the blank to achieve a transverse curvature. It is particularly important that the outside surface 20 be accurately formed. Hot forming in the range of 1550° to 1600° F. (843°-871° C.) between dies 22 and 24 produces the proper coining while avoiding unacceptable spring back. This is carried out with an argon blanket shield to reduce alpha case formation which would occur in an air environment, although it could also be carried out in a vacuum.

Block 4 of FIG. 1 notes the cleaning operation wherein the hot formed plates 10 are grit blasted and chemically cleaned in preparation for the next operation. This removes alpha case which would interfere with final blade integrity.

Figure 4:
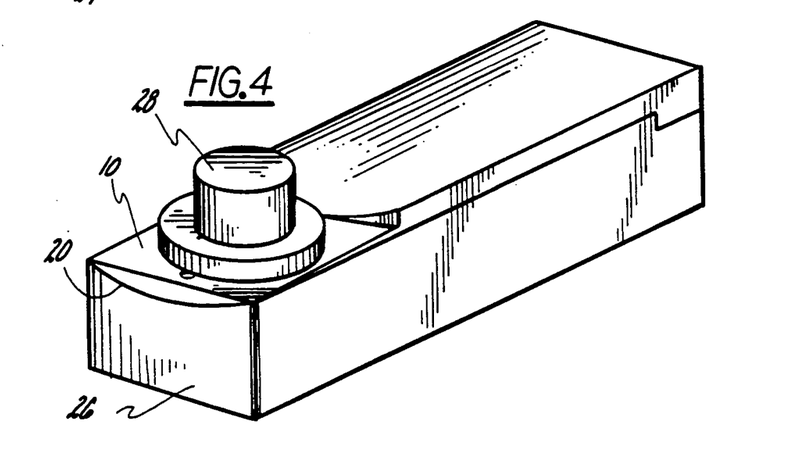
FIG. 4 illustrates the flat machining of the concave surface.

Machining the concave surface flat as indicated in block 5 is carried out with the use of a contoured vacuum chuck 26. The blank 10 is held therein in precise alignment with the die, and cutter 28 produces a flat bond plane of precise dimension from outer surface 20 which is held against the chuck.

Figure 5:
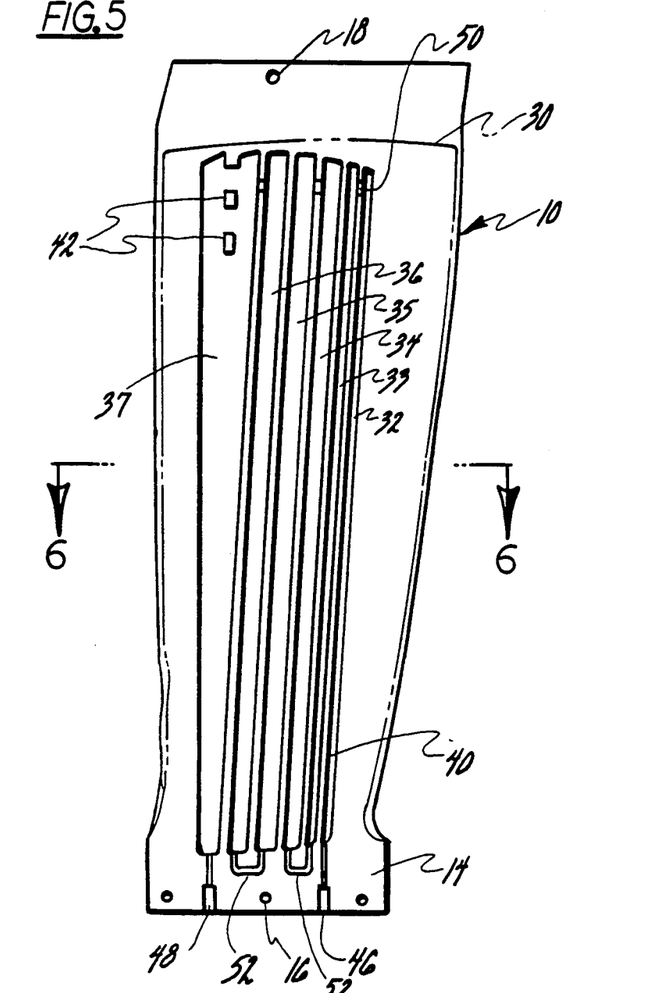
FIG. 5 illustrates the ribs machined in the blank and provision for the gas purge flowpath.
Figure 6:
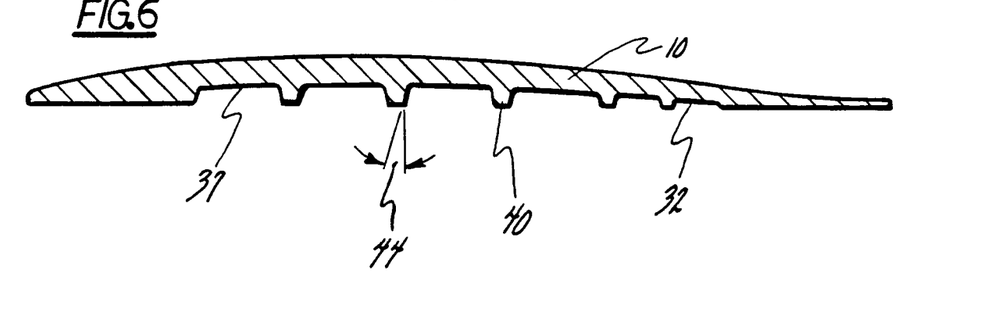
FIG. 6 is a section through FIG. 5.

The machining of grooves indicated in block 6 is carried out with blank 10 still located in the vacuum chuck. Accordingly, the same precision of dimensions is retained. FIGS. 5 and 6 illustrate the results of this machining in more detail. Within the overall blank 10 there is shown a phantom line 30 which represents the ultimate blade outline. The excess material is an allowance for trimming.

Within the blade half, a plurality of grooves 32 through 37 are machined, leaving lands 40. Groove 37 is particularly wide and the machining is carried out to leave islands 42 to avoid collapse of the skin surface during later forming operations. Each land is formed with an angle 44 of 15° from the vertical whereby an hourglass shaped will be formed when two halves are bonded together.

Semicircular grooves 46 and 48 are machined for later reception of an inlet and outlet argon purging tube 56 respectively. Grooves 32 and 33 are fluidly connected by a slight machined recess 50 in the land at one end as are grooves 34 and 35, and grooves 36 and 37. Within root 44 there are machined recesses 52 on one surface connecting grooves 33 and 34, and grooves 35 and 36. It can be seen that a continuous serial fluid flowpath is achieved through the grooves within the blade from inlet 46 to outlet 48. Recesses 50 and 52 need be installed only in one of the two blade halves which will ultimately be formed.

Block 7 indicates the deburring and chemical cleaning operation following this machining operation. This properly prepares the surface for later diffusion bonding.

The steps defined in blocks 2 through 7 are then repeated for the opposite blade half 54 which is to be bonded to blade half 10. Experimental operations to date have used both blade halves with the same transverse curvature. It is, however, possible that a different curvature for one half than the other may prove to be profitable with certain final blade configurations.

Figures 7, 8, 9:
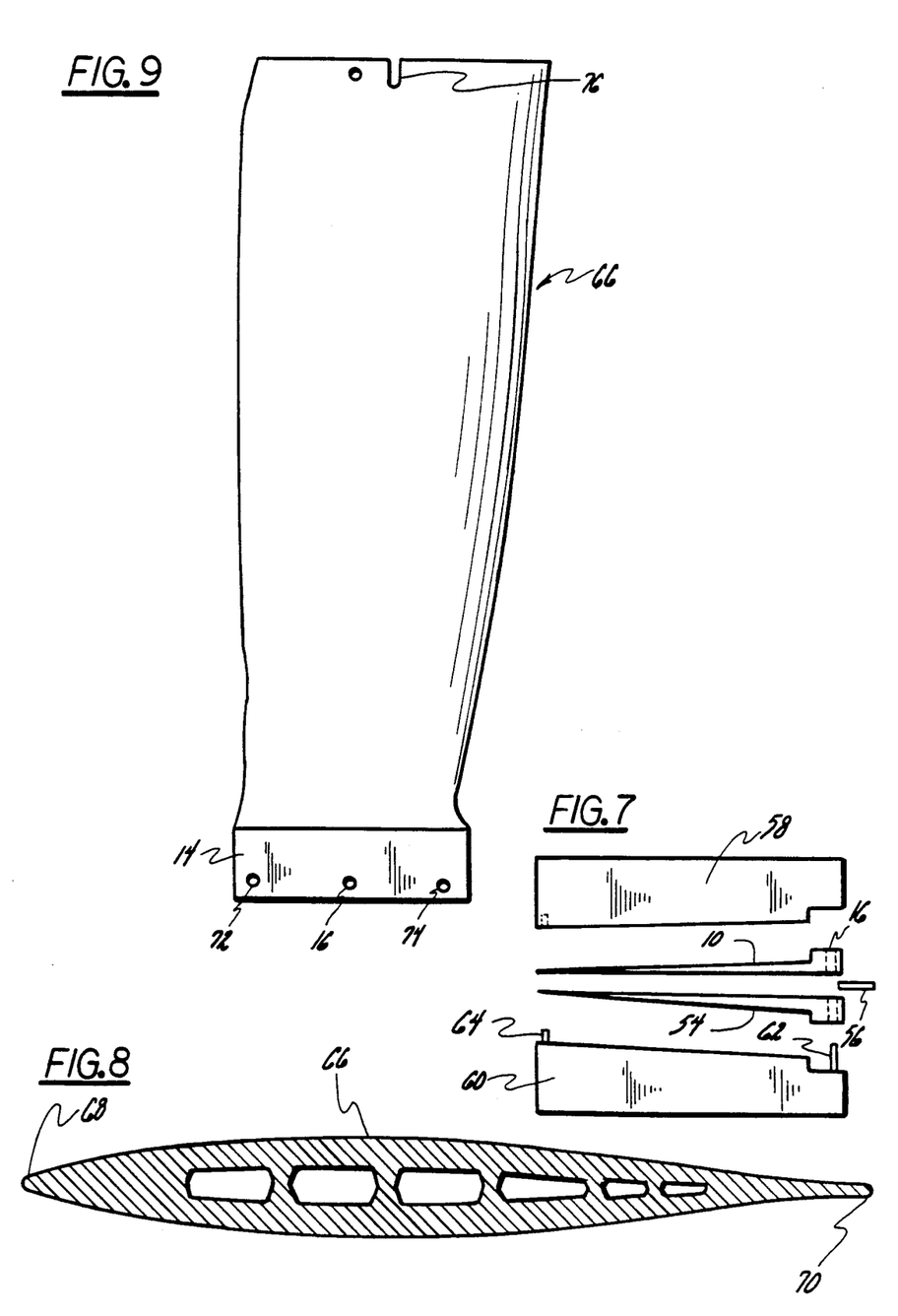
FIG. 7 illustrates the diffusion bonding.
FIG. 8 illustrates the section after bonding.
FIG. 9 illustrates the locating and holding features in the untwisted blade in preparation for creep forming.

Block 9 recites and FIG. 7 illustrates diffusion bonding of the first blade half 10 with the second blade half 54. It also illustrates stainless steel tubes 56 which are bonded simultaneously in openings 46 and 48.

Diffusion bonding occurs between upper and lower bond dies 58 and 60, respectively, with the die faces being coated with a suitable release agent such as boron nitride to prevent interaction between the titanium details and the molybdenum dies during diffusion bonding.

Diffusion bonding is accomplished in a semicontinuous vacuum hot press. The fixtured assembly is placed in a first chamber of the vacuum press and the chamber evacuated. This assembly moves into a second chamber which is a preheat zone where the temperature is raised to 1600° F. (871° C.). When this temperature is stabilized the assembly moves to the main chamber containing the press ram. When the fixtured assembly is stabilized at approximately 1700° F. (927° C.) with the vacuum level of approximately $5 \times 10^{-5}$ Torr held, the ram is lowered and a load of approximately 3,000 lbs. per square inch (210 Kg/square cm on the mating bonding surface is applied. This is held for approximately one hour. Any temperature and pressure suitable for diffusion bonding may be used.

Bond die 60 has alignment pins 62 and 64 which pass through alignment openings 16 and 18, respectively, in the blade halves. This produces the appropriate precise alignment of the parts.

Tubes 56 are closed at the end. Since the bonding is accomplished in a vacuum, the blade interior is sealed under vacuum.

The straight, untwisted blade 66 which is lenticular in cross section is illustrated in FIG. 8. The bonded assembly, still within the die and of the illustrated shape, is cooled under vacuum to approximately 500° F. (260°

C.) and then removed. This is required for protection of the molybdenum dies.

The hourglass shape of the ribs with this minimum cross section at the diffusion bond plane results in the highest compressive stress at this location. Accordingly, material flow of a predetermined amount will occur at this point. It is also noted that the location of the diffusion bond in the center of the rib locates any minor crevice or concomitant stress concentration at this point. The bending stresses between the surface of the blade and the ribs are remote from this location.

The leading edge 68 and trailing edge 70 of the bonded and untwisted blade assembly are machined to a shape close to that required on the final blade, as shown in block 10. The cost and difficulty of installing the radii on the straight blade is considerably less than installation on the final blade form after twisting.

Datum holes 72 and 74 are established in root 14 at a known distance from the Z plane as suggested in block 11. At the tip end of the blade slot 76 is located at a preselected location. This location is a function of the creep forming operation carried out later. The Z plane is that plane in the blade root which will define the radial blade location when installed in a rotor disc.

Figure 10:
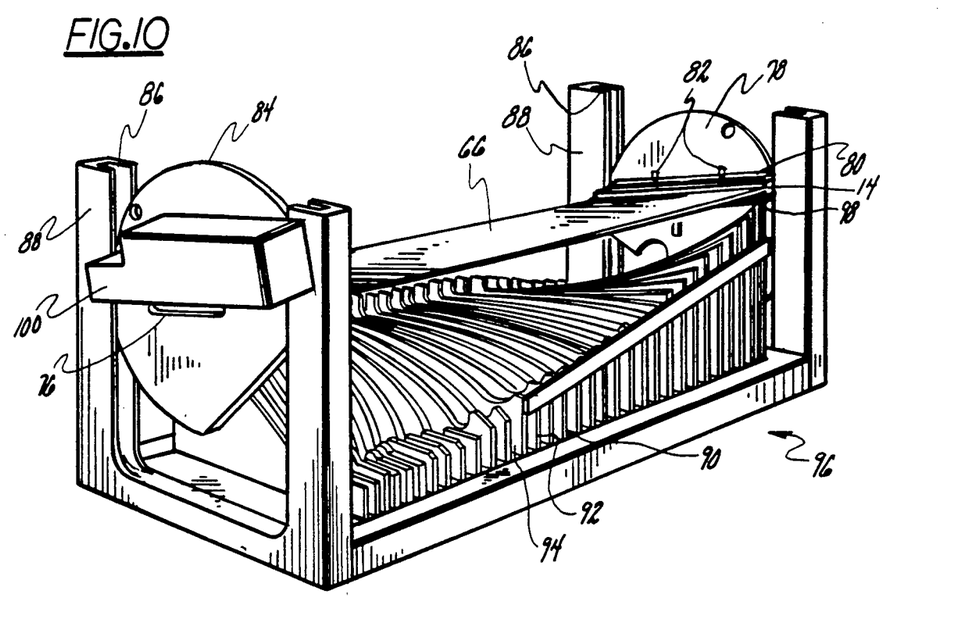
FIG. 10 illustrates the start of the creep forming operation.

The attachment of disks and weights to the blade set forth in block 12 is illustrated in FIG. 10 where the disk 78 containing clevis 80 is secured to root 14 of the blade with at least two pins 82. It is noted that with this constraint bending of the blade along the plane of the blade is constrained and axial movement of the blade toward or away from the disk is constrained.

Disk 84 is secured to the tip end of the blade with the clevis being pinned through slot 76. Accordingly the tip end of the blade is free to rotate small amounts in the plane of the blade and is also axially unrestrained. During the twisting operation the tip of the blade is free to move toward or away from the root. Each end of the blade is additionally constrained within the edges of the clevis against movement perpendicular to the edge of the blade.

Each disk 78 and 84 is retained within slots 86 of substantially vertical channels 88. Each disk therefore is free to rotate, but is guided in vertical movement by the channels and constrained from axial movement by the channels.

The blade is supported above creep die 90. There is no upper die and no compressive loading placed on the blade. Each die 90 is formed of a plurality of spaced segments 92 with gas spaces 94 therebetween. The die or form 90 is coated with a ceramic coating to prevent interaction with the titanium blade during forming. As initially placed in the die preforming apparatus 96, a blade 66 rests on the high point 98 of die 90. An eccentric weight 100 is located on each of the disks (block 12, and FIG. 10). This provides the desired twisting moment and variation in the twisting moment depending on the angular position of the weight at the beginning of the operation.

The fixture and blade of FIG. 10 is placed within a vacuum furnace or an argon retort and heated at a controlled rate to 1750° F. (952° C.) (block 13). During this heat cycle the titanium blade creeps toward the contoured die form at a very slow rate. Simultaneously weights 100 apply a twisting moment to the blade. The blade creeps at a very slow rate until it rests on the die forming the twisted blade 101. The weight is selected to provide a rate of twist such that the twisting and sagging occurs simultaneously with a side of a blade more or less uniformly coming into contact with the die. Too much or too little twist would cause one edge of the blade to contact first starting a twisting in the wrong direction locally which would have to be removed by the final twisting. If carried out in an argon retort, internal argon purge should be used to avoid collapse into the vacuum.

The rate of temperature rise tolerable during heating is a function of the part geometry. If the rate is too rapid, thin portions will heat well ahead of thicker portions. Creep will then occur prematurely resulting in inappropriate distortions.

It is noted that since the purge tubes were sealed in a vacuum the blade contains a vacuum at this time. Accordingly, during heating the blade in an argon retort or in any event during the start of the later argon cooling, pressure above the vacuum level will be established on the outside of the blade. It is for this reason that islands 42 shown in FIG. 5 were placed in the wide channels within the blade.

The arrangement of disks and weights can vary extensively depending on the design of the blade to be formed. Even with the single selected design there remains a large variety of arrangements which could produce the blade, but with some of these producing less material displacement than others. The blade need not necessarily be located on the center axis of each disk, and the substantially vertical channels 88 cooperating with each disk need not be completely perpendicular. Further, the locating point between tip 76 and disk 84 may be offset to one side or another.

It should be appreciated that the formation of the blade is not simply twisting the blade around a centerline through and perpendicular to the root of the blade. There will usually be some offset or translation of the blade away from this centerline, frequently to a point where no portion of the tip interacts with this centerline. Accordingly, some selections of the arrangement producing this translation with less metal deformation are to be preferred, but whichever approach is selected must be used in the finite element calculation establishing the initial form.

Figure 11:
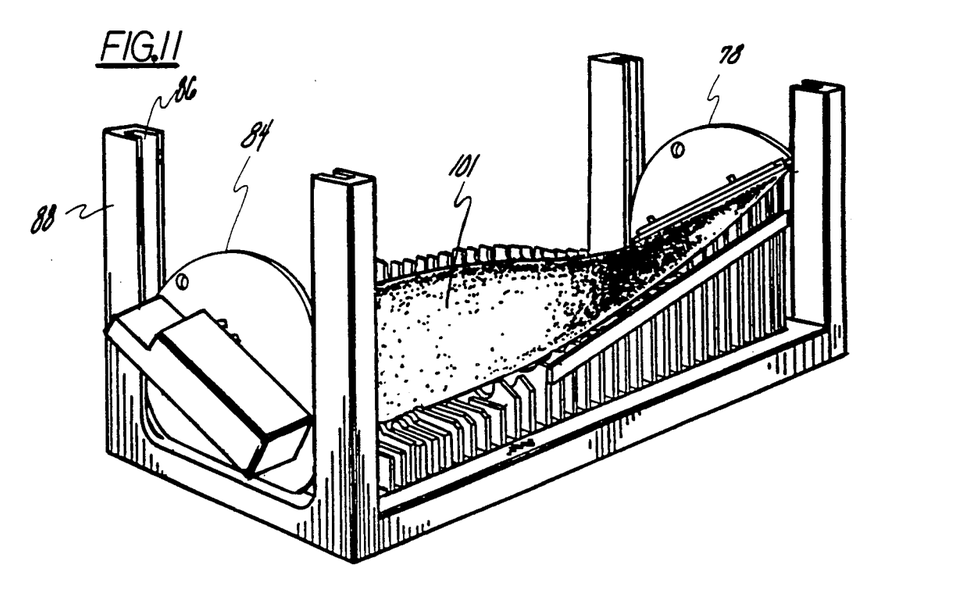
FIG. 11 illustrates the end of the creep forming operation.

FIG. 11 illustrates the substantially twisted blade 101 as it settles down on the die form 90 in its twisted form. Solution heat treatment soaking is carried out simultaneously with this creep deformation by maintaining the temperature for one hour to put the beta structure in solution. The soak is followed by rapid cooling at 120° F. (67° C.) per minute. This is accomplished with an argon quench (block 14) by passing the cool argon against the blade, this being made possible by the spaced support arrangement of the blade support die. The freedom and support of the blade at the tip end permits the blade to cool and shrink without thermal differences between the blade and the fixture which could cause blade distortion.

The invention achieves the majority of the twisting for the final blade shape in this operation and preferably at least 80 percent of the twisting. This gravity creep forming operation is repeatable from blade-to-blade and may be more easily predicted in the finite element analysis since there is an absence of die friction and other variables affecting the prediction of other types of forming.

A fine grain structure facilitates the metal flow during creep and superplastic forming. After starting with a fine grained structure, the forming steps are carried out with operations to minimize the time-temperature conditions promoting grain growth. The simultaneous solution soak for solution heat treatment and the gravity creep forming effectively reduces grain growth. This soak is performed at 50° to 75° F. (28° to 42° C.) below the phase transition temperature. In most cases the creep forming will be substantially completed during the temperature ramp up.

Block 15 indicates the cleaning following the creep forming operation where the assembly is chemically cleaned for the purpose of removing die lubricants.

As shown in blocks 16 and 17 the purge tubes are opened and the die placed in a preheated oven where it is heated to 300° F. (149° C.). A flow of argon gas is passed through the cavities of the blade in a flow pattern until a dew point of approximately −60° F. (−51° C.) is established. This ensures the removal of sufficient water vapor to avoid hydrogen or oxygen attack in the interior of the blade.

Figure 12:
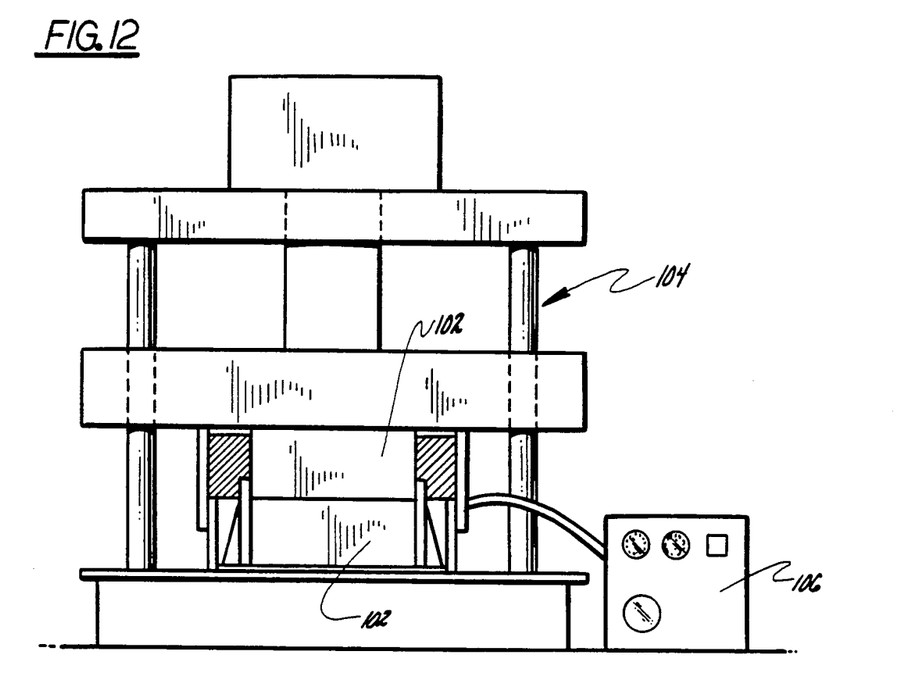
FIG. 12 illustrates the superplastic forming and argon gas sizing.

The blade is then moved into a heated die set 102 of press 104 for superplastic forming as indicated in block 18. While plastic deformation of material is usually limited by excessive necking on tensile deformation, certain materials exhibit superplastic phenomena. Titanium is one of these materials and the superplastic phenomena is a function of the grain size, the temperature level and the strain rate. This final forming step is preferably carried out in that range.

The dies are at a forming temperature of 1550° F. (843° C.). Once the blade has come up to that forming temperature the die is slowly closed at a controlled rate consistent with the superplastic forming demands. The argon purge is continued throughout this time, permitting monitoring for contamination, and facilitating internal pressure control at a level only slightly above atmospheric.

If a relatively flat piece were to be placed between the dies, rather than the substantially twisted piece, large spaces would exist between the dies and the part. Uniformity of heating and accurately predictable metal flow would be sacrificed.

Once the die is closed, the discharge from the purge chamber is closed and the pressure from controller 106 is built up in the cavities of the blade to approximately 600 psi (4200 kilopascals). The pressure is held for approximately 10 minutes after which time it is reduced to purge flow levels and the vent is reopened. This internal pressure reforms any material between the ribs which may have deformed away from the face of the dies.

The die for this operation is the final form die which after allowing for temperature shrinkage is the final shape and size, except for a chemical milling allowance described later. Inherent tolerances exist in any operation and it is undesirable to find this blade undersized since size consistency is desired. An undersized blade would also result in bulges from the argon pressure forming operation. Accordingly, the thickness of the formed blade up to this point is established such that with all negative tolerances it will not be below the final desired thickness. Some excess material is therefore expected to exist. During the superplastic forming operation this excess material is accommodated by compressing the ribs, particularly the narrow portion of hourglass ribs which have been indicated as preferred.

It has been found that where local deformation of the material is not too great, conventional creep forming between the dies is acceptable.

As indicated in block 19 the blade is then chemically milled removing approximately 0.003 to 0.004 inches (0.08 to 0.10 mm) to remove any die lubricants and any alpha case which may have formed.

Figure 13:
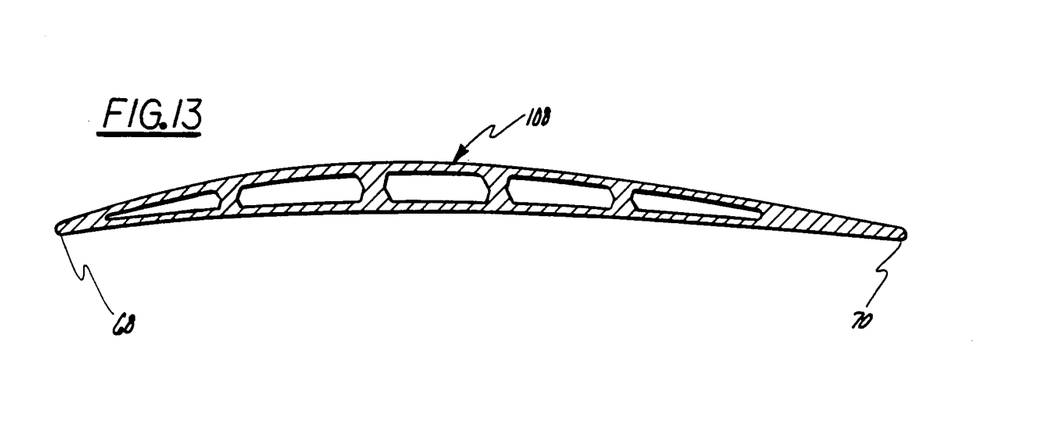
FIG. 13 is a cross section of the final blade form showing the blend area.

As noted in block 20, the leading edge 68 and trailing edge 70 of the final form blade 108 may be blended by hand scraping. The root form may then be machined from root 14, as required.

Aging of the blade as noted in block 21 is then carried out at a temperature of 1100° F. (592° C.) for 6 hours. The final block 22 suggests the conventional peening, coating, moment weighting, and marking of the blades which is thereafter carried out. This prepares the blades for installation in a compressor as required.

Figure 14:
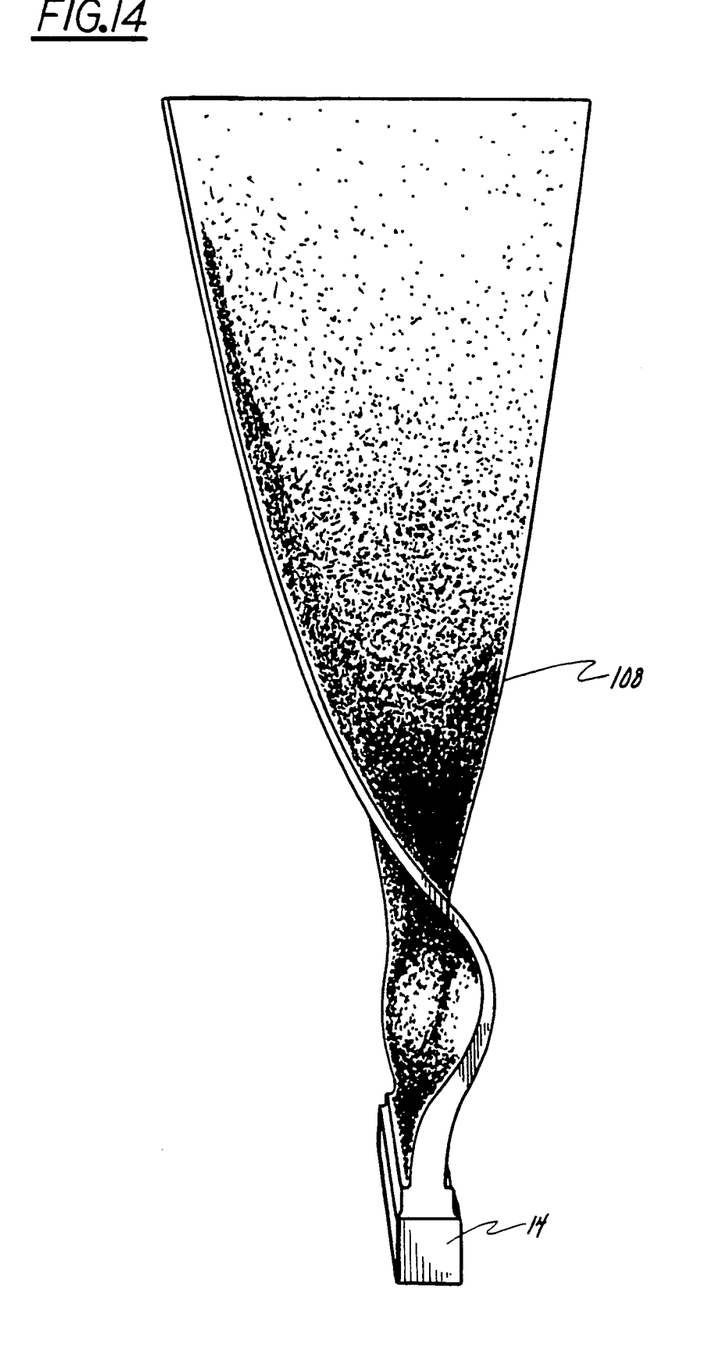
FIG. 14 is a view of the final blade before root machining.

FIG. 14 illustrates the form of final blade 108, before machining of the root form.

Gravity creep forming to produce a predominant portion of the twisting facilitates prediction of metal flow. Simultaneous heat soak for solution heat treating minimizes grain growth as well as saving time. Internal pressure at the final forming operation avoids an undulated blade surface.

We claim:

1. A method of forming a hollow internally reinforced titanium alloy blade, having a longitudinal axis, with predictable metal flow comprising:

forming a hollow untwisted blade of lenticular cross section and having axially extending ribs connecting opposite walls of the blade;

creep deforming said untwisted blade without compressive loading on said untwisted blade other than at the very ends, and without axial restraint of said untwisted blade other than at one end, to a twisted blade by, placing said hollow untwisted blade on a shaped die half, heating said hollow untwisted blade to a temperature level at which creep takes place with gravity force deforming said untwisted blade into contact with said die, and simultaneously applying twisting moments at each end of said hollow untwisted blade;

final hot forming said twisted blade to a final form blade by:

placing said twisted blade between a pair of final form dies, heating said twisted blade to at least the temperature at which creep takes place, but less than the phase transformation temperature, closing said final form dies, and applying an internal pressure with said final form dies closed;

the twisted blade formed in the creep deforming step having at least 80 percent of the twist of the final form blade;

cooling said final form blade; and blending the leading and trailing edges of said final form blade.

2. A method as in claim 1 comprising also:

machining the leading edge and trailing edge of said untwisted blade after diffusion bonding and before twisting.

3. A method as in claim 1 comprising also:

solution heat treating said blade simultaneously with creep deforming said untwisted blade by holding said twisted and/or untwisted blade at the solution soak temperature for one hour and thereafter quenching said twisted blade.

4. The method of claim 3 wherein the step of creep deforming includes:

providing said die half with spaced shaped supports.

5. A method as in claim 4 comprising also:
quenching said twisted blade after creep deforming by passing an inert gas flow between said shaped supports.

6. The method of claim 5 and including also:
preheating said untwisted blade to about 1750° F. in a vacuum atmosphere;
holding the temperature at 1750° F. for one hour; and
thereafter quenching said twisted blade at a rate of approximately 120° F. per minute.

7. A method as in claim 1 comprising also:
sizing said blade thickness to carry excess blade thickness compared to the desired final blade nominal thickness up to the step of final hot forming.

8. A method of claim 1 wherein the step of forming a hollow untwisted blade includes:
forming said ribs of hourglass cross section.

9. A method as in claim 1 wherein the step of forming a hollow untwisted blade includes:
forming said ribs with the spaces between said ribs in fluid communication with an adjacent space at each end, whereby a series flowpath is established for inert gas purge.

10. A method as in claim 9 wherein:
the fluid communication between adjacent spaces at the root end of said untwisted blade comprises a flowpath through the root of said hollow untwisted blade.

11. A method as in claim 1 wherein the step of forming said untwisted blade includes:
forming islands extending between opposite sides of the untwisted blade in areas where said ribs are widely spaced.

12. A method as in claim 1 wherein the step of forming said untwisted blade comprises:
flat machining a tapered blank for a first blade half and a second blade half;
hot forming each blank to a prescribed cross-sectional curvature;
machining flat the concave side of each blank;
machining longitudinal grooves, leaving ribs therebetween in each blade half; and
diffusion bonding the two blade halves together.

13. A method as in claim 12 comprising also:
inserting a purge tube in fluid communication with the interior of said untwisted blade while diffusion bonding.

14. A method as in claim 13 comprising also:
inserting at least two purge tubes in fluid communication with the interior while diffusion bonding.

15. The method of claim 1 wherein the step of creep deforming said untwisted blade comprises:
rotating the root end of said untwisted blade with restraint in the axial direction and in the blade plane bending direction; and
rotating the tip end without restraint in the axial direction and blade plane bending direction.

16. The method of claim 15 wherein the step of rotating each end of said hollow untwisted blade comprises:
rotating each end of said untwisted blade by applying eccentric weight thereto.

17. The method of claim 16 wherein the step of creep deforming includes:
providing said die half with spaced shaped supports; and
quenching said twisted blade after creep deformation by passing an inert gas flow between said shaped supports.

18. The method of claim 1 wherein the step of creep deforming said untwisted blade comprises:
rotating each end of said untwisted blade by applying eccentric weight thereto.

19. The method of claim 18 wherein the step of rotating each end of said untwisted blade comprises:
securing a disk to each end of said untwisted blade;
locating the outside edge of each disk in substantially vertical channels and securing eccentric weights to each disk.

20. The method of claim 1 wherein the step of hot final forming includes:
heating said twisted blade to a superplastic temperature with heated final form dies.

21. A method as in claim 20 wherein said heated final form dies are at a temperature between 1500° and 1550° F.

22. A method as in claim 21 wherein the step of superplastic forming includes:
applying an internal pressure with an inert gas.

23. A method as in claim 1 wherein the step of hot final forming includes:
applying an internal pressure with an inert gas after said final form dies are closed.

24. The method of claim 23 wherein said inert gas pressure is maintained greater than 500 psi for more than five minutes.

25. A method of forming a hollow internally reinforced titanium alloy blade, having a longitudinal axis with predictable metal flow comprising:
forming a hollow untwisted blade of lenticular cross section and having axially extending ribs of hourglass cross section connecting opposite walls of the untwisted blade;
machining the leading edge and trailing edge of said untwisted blade;
creep deforming said untwisted blade without compressive loading other than at the very ends, and without axial restraint other than at one end, to a twisted blade by,
placing said untwisted blade on a shaped die half,
heating said untwisted blade to a temperature level at which creep takes place with gravity force deforming said untwisted blade into contact with said die, and
simultaneously applying twisting moments at each end of said untwisted blade;
solution heat treating said untwisted blade simultaneously with creep deforming said untwisted blade by holding said untwisted blade at the creep forming temperature for one hour and thereafter quenching said twisted blade;
final hot forming said twisted blade to a final form blade by,
placing said twisted blade between a pair of final form dies,
heating said twisted blade to at least the temperature at which creep takes place, but less than the phase transformation temperature,
closing said final form dies, and
applying an internal pressure with said final form dies closed;
the step of creep deforming said untwisted blade comprising deforming said untwisted blade to a twisted blade having at least 80 percent of the twist of the final form blade;

cooling said final form blade; and blending the leading and trailing edges of said final form blade.

26. A method as in claim 25 wherein the step of forming said untwisted blade includes:

forming said ribs with the spaces between said ribs in fluid communication with an adjacent space at each end, whereby a series flow path is established for inert gas purge; and forming islands extending between opposite sides of the untwisted blade in areas where said ribs are widely spaced.

27. The method of claim 26 wherein the step of creep deforming said untwisted blade comprises:

rotating the root end of said untwisted blade by applying eccentric weight thereto, with constraint of said root end in the axial direction and in the untwisted blade plane bending direction; and rotating the tip end of said untwisted blade by applying eccentric weight thereto, without constraint of the tip end in the axial direction and untwisted blade plane bending direction.

28. The method of claim 27 wherein the step of hot final forming includes:

heating said twisted blade to a superplastic temperature with heated dies; and applying an internal pressure with an inert gas pressure after said heated dies are closed.

29. A method of twisting a hollow elongated titanium alloy member, having a longitudinal axis, comprising:

gravity creep deforming said untwisted member without compressive loading of said member other than at the very ends, and without axial restraint of said member other than at one end, to a twisted member by, placing said untwisted member on a shaped die half, heating said untwisted member to a temperature level at which creep takes place with gravity force deforming said untwisted member into contact with said die half, and simultaneously applying twisting moments at each end of said untwisted member.

30. The method of claim 29 wherein the step of creep deforming said untwisted member comprises:

rotating a first end of said untwisted member with constraint of said first end in the axial direction; and rotating the second end of said untwisted member without constraint of said second end in the axial direction.

31. The method of claim 30 wherein the step of rotating each end of said untwisted member comprises:

rotating each end of said untwisted member by applying eccentric weight thereto.

32. The method of claim 31 wherein the step of rotating each end comprises:

securing a disk to each end of said untwisted member;

locating the outside edge of each disk in substantially vertical channels and securing eccentric weights to each disk.

33. The method of claim 29 wherein the step of creep deforming includes:

providing said die half with spaced shaped supports.

34. A method as in claim 33 comprising also:

quenching said twisted member after creep deforming by passing an inert gas flow between said shaped supports.

35. The method of claim 33 and including also:

preheating said untwisted member to about 1750° F. in a vacuum atmosphere;

holding the temperature at 1750° F. for one hour; and thereafter quenching said twisted member at a rate of approximately 120° F. per minute.

* * * * *

UNITED STATES PATENT AND TRADEMARK OFFICE
CERTIFICATE OF CORRECTION

PATENT NO. : 5,063,662

DATED : November 12, 1991

INVENTOR(S) : David Porter et al

It is certified that error appears in the above-identified patent and that said Letters Patent is hereby corrected as shown below:

Col. 10, line 21,

Claim 22 - delete [21] and insert --20--.

Signed and Sealed this

Thirty-first Day of August, 1993

Attest:

BRUCE LEHMAN

Attesting Officer

Commissioner of Patents and Trademarks